Figure 5:
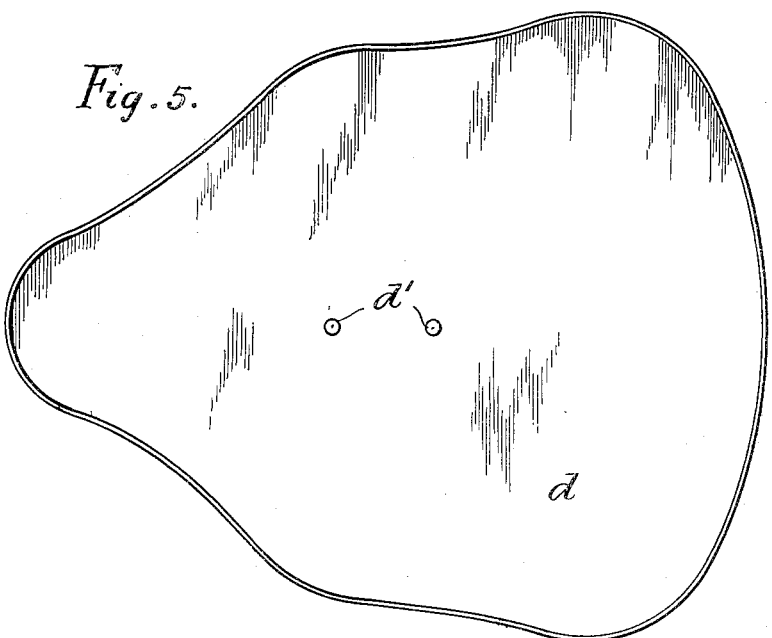

J. AND H. JELLEY.
METHOD OF PRODUCING COMPOSITE RUBBER AND FABRIC CYCLE SADDLE TOPS.
APPLICATION FILED JULY 6, 1918.
1,358,957.
Patented Nov. 16, 1920.
2 SHEETS—SHEET 1.
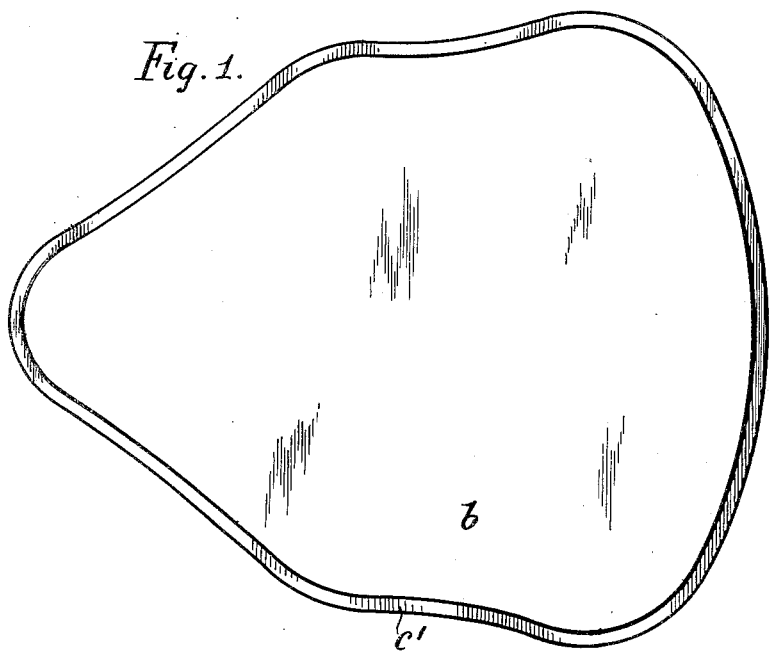
Fig. 1.
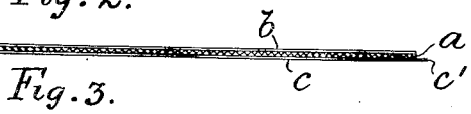
Fig. 2.
Fig. 3.
Fig. 4.
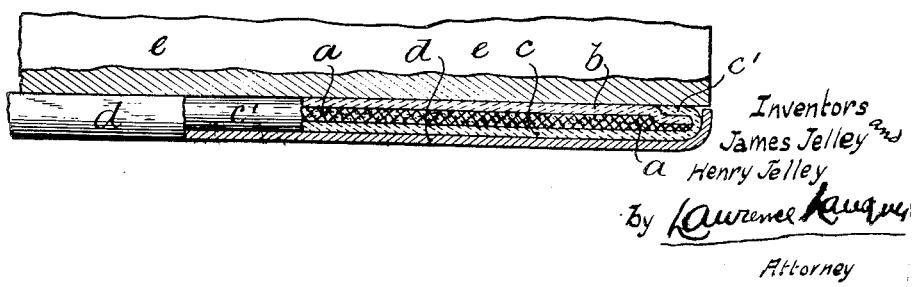
Inventors
James Jelley and
Henry Jelley
By Lawrence Langner
Attorney

Fig. 4ᴬ

Fig. 8ᴬ

Inventors
James Jelley and
Henry Jelley
by Lawrence Langner
Attorney

UNITED STATES PATENT OFFICE.

JAMES JELLEY, OF COVENTRY, AND HENRY JELLEY, OF BIRMINGHAM, ENGLAND.

METHOD OF PRODUCING COMPOSITE RUBBER AND FABRIC CYCLE SADDLE-TOPS.

1,358,957.   Specification of Letters Patent.   Patented Nov. 16, 1920.

Application filed July 6, 1918. Serial No. 243,722.

*To all whom it may concern:*

Be it known that we, JAMES JELLEY, engineer, of 41 Spon street, Coventry, England, and HENRY JELLEY, engineer, of "Westover," Selly Park, Birmingham, England, both subjects of the King of Great Britain, have invented new and useful Improvements in Methods of Producing Composite Rubber and Fabric Cycle Sadle-Tops, of which the following is a specification.

This invention relates to cycle and similar saddle tops of the kind which are produced, by a pressure-blocking or molding and vulcanizing process, from blanks of composite material consisting of canvas or other fabric covered or faced with india-rubber.

According to the said invention, the composite saddle tops are made in such a manner that the edges are covered or sheathed in solid rubber, with the result that the finished saddle top is perfectly waterproof since the rubber-sheathed edgings renders it impossible for damp or moisture to reach the canvas or fabric. The complete concealment of the canvas also gives a better finish or appearance to the saddle.

To obtain this result, in making up the composite blanks, either or both of the upper and under layers of rubber are cut larger all around than the interposed layer or layers of canvas or fabric and when subjecting the blanks to pressure treatment, the edge or edges of the larger rubber layer or layers is, or are, closed together or turned, rolled, or folded over the edge or edges of the canvas and thus made to completely sheath, cover or inclose the canvas or fabric.

In the accompanying drawings, Figure 1 is a plan and Fig. 2 is a longitudinal section of a flat saddle-top blank, consisting of a layer of canvas or the like $a$ and two covering layers of rubber $b$, $c$; the undermost layer $c$ being larger than $a$ and $b$ to provide marginal material $c^1$ for producing a turnover. This blank is placed (as shown diagrammatically in Fig. 3) in a shallow flat tray $d$, a series of such trays each containing a blank of the same kind being superimposed and subjected to pressure between a pair of suitable pressure plates (one of which is shown and marked $e$ in Fig. 3) which has the effect of turning over the extending marginal edge $c^1$ of the layer $c$ in each blank and closing over and compressing the same to produce a waterproof joint such as shown on a larger scale in Figs. 4, and 4ª.

Figure 6:

The flat trays $d$ may, if desired, be used as dies to impress a pattern or lettering in the rubber during the operation of turning over and closing the edge of the larger layer, and further, as shown in plan in Fig. 5 and in longitudinal section in Fig. 6, the tray may be formed with projections at $d^1$, to impress in one of the covering layers of the blank, marks to indicate the exact positions in which the holes are to be made to provide engagements for the blank-locating pins of the molding or shaping dies.

Figure 7:
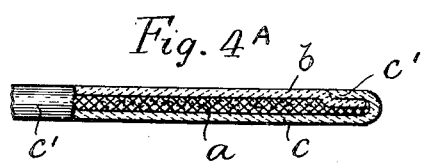
Figure 7:
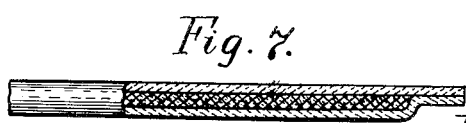
Figure 8:
Figure 8:
Figure 9:
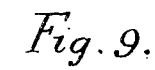

Instead of only one of the rubber layers in each blank being larger than the canvas, both rubber layers may extend all around beyond the edge of the canvas (see Fig. 7) to produce a double thickness rubber margin which, when folded and closed over by the pressure plates, produces double-closed joints such as shown in section in Figs. 8 and 8ᴬ. The same or similiar methods of producing blanks with rubber-sheathed edges may be adopted in the case of blanks (such as the example shown in Fig. 9) made up of two or more layers or pieces of canvas separated by an interposed layer of rubber and covered on the upper and under surfaces with rubber whose edge or edges is, or are, turned over and compresses onto or into the canvas to make a joint according to one or other of the methods already referred to.

In some cases where the composite blanks are not subjected to preliminary pressure and heat treatment in the flat, the turning over of the rubber margins or selvages to produce waterproof edges may be effected during the process of shaping the blank in the molding dies. In such an alternative process, the turning over of the rubber can be effected by employing an upper or male shaping die which is formed with a flange or shroud, adapted to turn over and compress the extending selvage or selvages of the rubber layer or layers in the blank on the said die being forced down onto the said blank that is contained and located in the female die. Or any other convenient method and means may be adopted for turning over and closing the rubber selvages during any stage of the production of the saddle top prior to the final vulcanization of the said top in the shaping dies.

Having described our invention, what we claim and desire to secure by Letters Patent is:—

1. The production of composite rubber and fabric cycle and similar saddle tops, consisting in shaping a layer of fabric, similarly shaping layers of rubber with edges extending beyond the edge of the fabric, superimposing said layers with the fabric layer intervening between the rubber layers, folding the edges of the rubber layers upon one another, and compacting the folded edges together by pressure.

2. The production of composite rubber and fabric cycle and similar saddle tops consisting in shaping a layer of fabric, similarly shaping layers of rubber with edges extending beyond the edge of the fabric, superimposing said layers with the fabric layer intervening between the rubber layers, compacting the edges of the rubber layers together by pressure and simultaneously forming indentations on the surface of one rubber layer.

3. The production of composite rubber and fabric cycle and similar saddle tops consisting in shaping a layer of fabric similarly shaping layers of rubber with edges extending beyond the edge of the fabric superimposing said layers with the fabric layer intervening between the rubber layers compacting the edges of the rubber layers together by pressure and impressing a pattern in one of the rubber layers during the operation of compacting the edges of the rubber layers together by pressure.

Signed at Birmingham, England, this 7th day of June, A. D. 1918.

JAMES JELLEY.
HENRY JELLEY.